March 4, 1952 R. S. BROWNIE 2,587,963
LEVER ADJUSTER FOR CASEMENT WINDOWS
Filed July 21, 1950
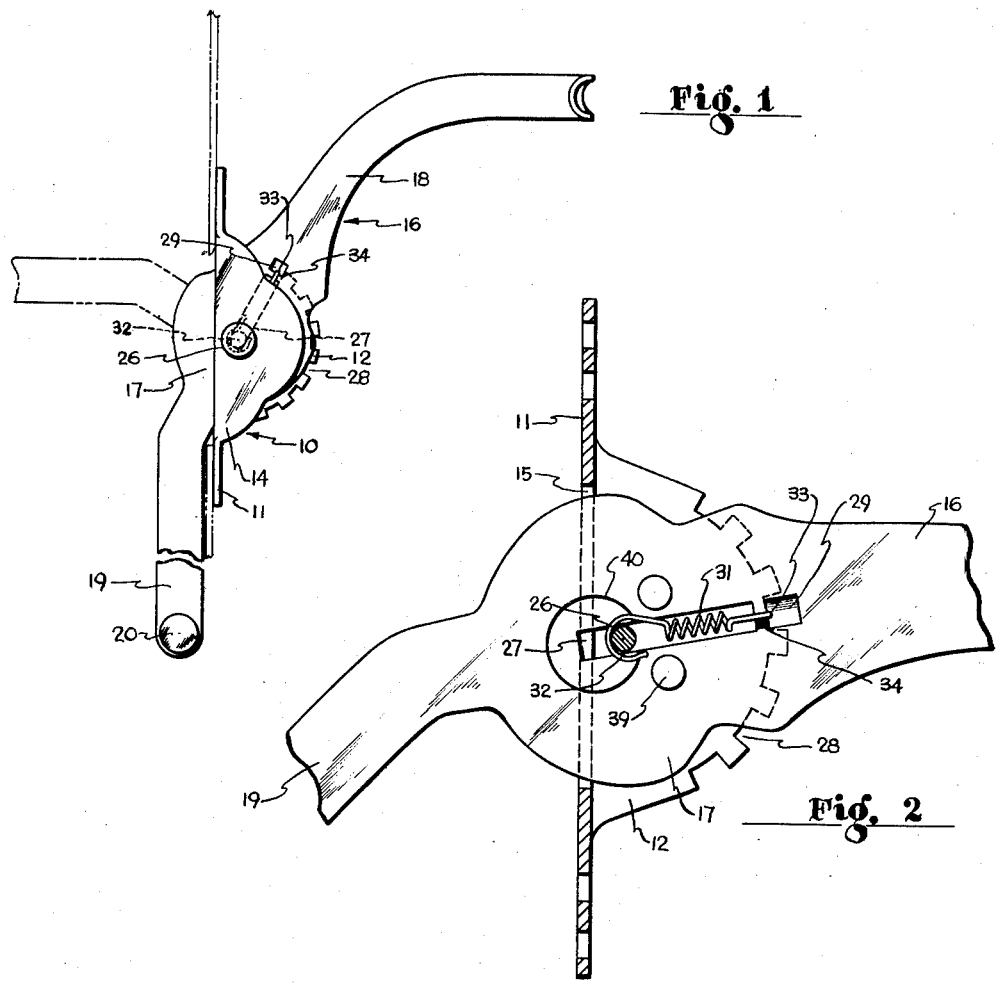
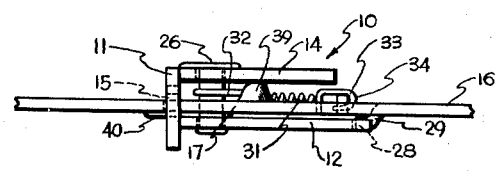
INVENTOR.
REX S. BROWNIE
BY Daniel G. Cullen
Attorney Patented Mar. 4, 1952

2,587,963

UNITED STATES PATENT OFFICE 2,587,963

LEVER ADJUSTER FOR CASEMENT WINDOWS

Rex S. Brownie, Detroit, Mich., assignor to International Hardware Manufacturing Company, Detroit, Mich., a corporation of Michigan Application July 21, 1950, Serial No. 175,196

4 Claims. (Cl. 268—118)

Be it known that the undersigned has invented certain new and useful improvements in lever adjusters for casement windows of which the following is a specification.

This application relates to lever adjusters for casement windows and more particularly aims to provide a novel form of lever adjuster characterized by its extreme simplicity of manufacture and assembly and operation and its low cost.

Aims and objects of the present invention will be presently understood upon reference to the appended drawing.

In this drawing:

Fig. 1 is a small scale plan view of the adjuster.

Fig. 2 is a fragmentary enlarged plan view of the adjuster, with a part cut away for clarity.

Fig. 3 is a side view of Fig. 2.

The adjuster herein disclosed comprises a substantially semi-circular casing 10 having an attaching plate portion 11 adapted to be secured to a stationary window frame by suitable screws. The casing itself includes two semi-circular, parallel wings 12 and 14 which are spaced relatively. Plate 11 has an opening 15. Between said wings is a lever 16 having a center portion 17 and opposed ends 18 and 19. One of these ends is formed with a grip portion to serve as a handle. The other end 19 of the lever projects through opening 15 and is provided with a pin 20 whereby it may be connected to a ventilator or casement window whose position is to be regulated.

A pin 26 passes through said wings and through a slot 27 in the center 17 of the lever and provides a pivot for the lever and also has its ends riveted over to rivet or anchor the lever to the casing.

The semi-circular edge of one of the wings 12 is toothed or notched, as indicated at 28, to provide an indexing rack. The adjacent portion of the lever has a complementary tooth 29 and, since the lever is in a different plane from the toothed or notched wing 12, the tooth 29 of the lever is projected from the lever into the plane of the notched wing to cooperate with the notches of such wing for indexing. A coiled spring 31 having one end 32 hooked around pin 26 and its other end 33 connected to a lug 34 of the lever, as indicated, between slot 27 and tooth 29, connects the pin 26 and the lever 16 to urge the lever to move in the casing in such a direction that the lever tooth 29 tends to move towards the pin 26 and into whatever notch of the rack 28 happens to be, at a particular moment, in alignment with the tooth of the lever, whereby an adjusted position of the lever may be maintained by the co-action of the rack 28 and the lever tooth.

Dimples 39 of the lever portion 17 bear against the unnotched wing 14 to guide the lever in its movement between the wings and to maintain the lever in its plane, to inhibit cocking of the lever and maintain tooth 29 always in the plane of the notched wing 12.

The center 17 of the lever is depressed out of the plane of the lever to provide a hub 40 bearing against wing 12 and thus maintain the lever clear of the exposed or visible part of wing 12, with the result that lever movement does not mar or injure the finish of the visible part of wing 12.

The lever itself comprises a single, unitary, monoplanar piece of stock whose ends and center are integral. The lever and its tooth are formed as a single stamping.

It will be observed that the construction herein disclosed is simple and inexpensive, yet efficient and satisfactory.

The lever is moved only in its plane, so that its tooth 29 moves either towards or away from rack 28, or around rack 29. The lever is at no time cocked or raised away from wing 12. It is held clear of the visible part of wing 12 by hub 40 and is guided to move only in its plane by dimples 39.

Now having described the adjuster herein disclosed reference should be had to the claims which follow.

I claim:

1. A lever adjuster for a ventilator comprising a casing including an attaching plate adapted to be secured to a stationary window frame and having two semicircular parallel wings spaced relatively, said plate connecting said wings and having an opening, an adjusting lever between said wings having opposed ends, one of which ends is adapted to serve as a handle and the other of which projects through said opening and is adapted to be connected to the ventilator to be regulated, a pin passing through said wings and the center portion of said lever and providing in the casing a pivot for the lever and also serving to anchor the lever to the casing, the semicircular edge of one wing being toothed or notched to provide an index rack, and the adjacent portion of the lever having a complementary tooth projected from the lever into the plane of the notched wing, and spring means connecting said pin and said lever to urge the lever to move in said casing in such a direction that its tooth tends to move towards said pin and into a notch of the casing wing when such tooth radially alines with a notch, the lever at its center having a slot through which said pin passes to enable the lever to move in a manner to permit its tooth to move to and from the index rack, the lever comprising a single unitary piece whose ends and center are integral.

2. A lever adjuster for a ventilator comprising a casing including an attaching plate adapted to be secured to a stationary window frame and having two semicircular parallel wings spaced relatively, said plate connecting said wings and having an opening, an adjusting lever between said wings having opposed ends, one of which ends is adapted to serve as a handle and the other of which projects through said opening and is adapted to be connected to the ventilator to be regulated, a pin passing through said wings and the center portion of said lever and providing in the casing a pivot for the lever and also serving to anchor the lever to the casing, the semicircular edge of one wing being toothed or notched to provide an index rack, and the adjacent portion of the lever having a complementary tooth projected from the lever into the plane of the notched wing, and spring means connecting said pin and said lever to urge the lever to move in said casing in such a direction that its tooth tends to move towards said pin and into a notch of the casing wing when such tooth radially alines with a notch, the lever at its center having a slot through which said pin passes to enable the lever to move in a manner to permit its tooth to move to and from the index rack, the lever and the other or unnotched wing of the casing having formations cooperating to limit movement of the lever to rotation in its plane on the pin as a pivot, the lever comprising a single unitary piece whose ends and center are integral.

3. A lever adjuster for a ventilator comprising a casing including an attaching plate adapted to be secured to a stationary window frame and having two semicircular parallel wings spaced relatively, said plate connecting said wings and having an opening, an adjusting lever between said wings having opposed ends, one of which ends is adapted to serve as a handle and the other of which projects through said opening and is adapted to be connected to the ventilator to be regulated, a pin passing through said wings and the center portion of said lever and providing in the casing a pivot for the lever and also serving to anchor the lever to the casing, the semicircular edge of one wing being toothed or notched to provide an index rack, and the adjacent portion of the lever having a complementary tooth projected from the lever into the plane of the notched wing, and spring means connecting said pin and said lever to urge the lever to move in said casing in such a direction that its tooth tends to move towards said pin and into a notch of the casing wing when such tooth radially alines with a notch, the lever at its center having a slot through which said pin passes to enable the lever to move in a manner to permit its tooth to move to and from the index rack, the center portion of the lever having a hub not in the plane of the lever and bearing against the inner face of the notched wing to maintain the lever clear of such wing except at the hub of the lever, the lever comprising a single unitary piece whose ends and center are integral.

4. A lever adjuster for a ventilator comprising a casing including an attaching plate adapted to be secured to a stationary window frame and having two semicircular parallel wings spaced relatively, said plate connecting said wings and having an opening, an adjusting lever between said wings having opposed ends, one of which ends is adapted to serve as a handle and the other of which projects through said opening and is adapted to be connected to the ventilator to be regulated, a pin passing through said wings and the center portion of said lever and providing in the casing a pivot for the lever and also serving to anchor the lever to the casing, the semicircular edge of one wing being toothed or notched to provide an index rack, and the adjacent portion of the lever having a complementary tooth projected from the lever into the plane of the notched wing, and spring means connecting said pin and said lever to urge the lever to move in said casing in such a direction that its tooth tends to move towards said pin and into a notch of the casing wing when such tooth radially alines with a notch, the lever at its center having a slot through which said pin passes to enable the lever to move in a manner to permit its tooth to move to and from the index rack, the lever and the other or unnotched wing of the casing having formations cooperating to limit movement of the lever to rotation in its plane on the pin as a pivot, the center portion of the lever having a hub not in the plane of the lever and bearing against the inner face of the notched wing to maintain the lever clear of such wing except at the hub of the lever, the lever comprising a single unitary piece whose ends and center are integral.

REX S. BROWNIE.

REFERENCES CITED

The following references are of record in the file of this patent:

UNITED STATES PATENTS

| Number | Name | Date |
|---|---|---|
| 866,703 | Wilkins | Sept. 24, 1907 |
| 1,314,023 | Spencer et al. | Aug. 26, 1919 |
| 1,619,633 | Nicholson | Mar. 1, 1927 |
| 1,769,131 | Gray | July 1, 1930 |
| 2,312,720 | Lang | Mar. 2, 1943 |